United States Patent [19]

Shankland et al.

[11] Patent Number: 4,943,388

[45] Date of Patent: Jul. 24, 1990

[54] AZEOTROPE-LIKE COMPOSITIONS OF PENTAFLUOROETHANE; 1,1,1-TRIFLUOROETHANE; AND CHLORODIFLUOROMETHANE

[75] Inventors: Ian R. Shankland, Williamsville; Robert G. Richard, Cheektowaga; Earl A. E. Lund, West Seneca, all of N.Y.

[73] Assignee: Allied-Signal Inc., Morris Township, Morris County, N.J.

[21] Appl. No.: 372,576

[22] Filed: Jun. 28, 1989

[51] Int. Cl.$^5$ .......................... C11D 7/30; C11D 7/50
[52] U.S. Cl. ........................................ 252/69; 252/67; 252/162; 252/364; 252/DIG. 9; 62/114
[58] Field of Search ............... 252/162, 170, 171, 172, 252/364, DIG. 9, 67, 69; 203/67; 62/114

[56] References Cited

U.S. PATENT DOCUMENTS

| | | | |
|---|---|---|---|
| 2,101,993 | 12/1937 | Fleischer | 62/178 |
| 3,505,233 | 4/1970 | Clark | 252/67 |
| 3,732,150 | 5/1973 | Bailey | 203/44 |
| 4,303,536 | 12/1981 | Orfeo et al. | 252/67 |
| 4,810,403 | 3/1989 | Bivens et al. | 252/67 |

FOREIGN PATENT DOCUMENTS 1108292 4/1989 Japan.

OTHER PUBLICATIONS

Fluorocarbon Refrigerants Handbook, Prentice-Hall, 1988.
T. Atwood, "NARBS-The Promise and the Problem", American Society of Mechanical Engineers, Paper 86--WA/HT-61; 1986.
M. O. McLinden et al., "Methods for Comparing the Performance of Pure and Mixed Refrigerants in the Vapour Compression Cycle", Int. J. Refrig., 10, 318 (1987).

Primary Examiner—Paul Lieberman
Assistant Examiner—Kathleen Markowski
Attorney, Agent, or Firm—Melanie L. Brown; Jay P. Friedenson

[57] ABSTRACT

Azeotrope-like compositions comprising pentafluoroethane; 1,1,1-trifluoroethane; and chlorodifluoromethane are stable and have utility as refrigerants for heating and cooling.

9 Claims, No Drawings

AZEOTROPE-LIKE COMPOSITIONS OF PENTAFLUOROETHANE; 1,1,1-TRIFLUOROETHANE; AND CHLORODIFLUOROMETHANE

Field of the Invention

This invention relates to azeotrope-like or essentially constant-boiling mixtures of pentafluoroethane; 1,1,1-trifluoroethane; and chlorodifluoromethane. These mixtures are useful as refrigerants for heating and cooling.

CROSS-REFERENCE TO RELATED APPLICATION

Commonly assigned patent application Ser. No. 372,985 filed 6/28/89 (P. D. File 30-2998), discloses azeotrope-like mixtures of pentafluoroethane and 1,1,1-trifluoroethane.

BACKGROUND OF THE INVENTION

Fluorocarbon based fluids have found widespread use in industry for refrigeration applications such as air conditioning and heat pump applications.

Vapor compression is one type of refrigeration. In its simplest form, vapor compression involves changing the refrigerant from the liquid to the vapor phase through heat absorption at a low pressure and then from the vapor to the liquid phase through heat removal at an elevated pressure. First, the refrigerant is vaporized in the evaporator which is in contact with the body to be cooled. The pressure in the evaporator is such that the boiling point of the refrigerant is below the temperature of the body to be cooled. Thus, heat flows from the body to the refrigerant and causes vaporization. The formed vapor is then removed by means of a compressor in order to maintain the low pressure in the evaporator. The temperature and pressure of the vapor are then raised through the addition of mechanical energy by the compressor. The high-pressure vapor then passes to the condenser whereupon heat exchange with a cooler medium, the sensible and latent heats are removed with subsequent condensation. The hot liquid refrigerant then passes to the expansion valve and is ready to cycle again.

While the primary purpose of refrigeration is to remove energy at low temperature, the primary purpose of a heat pump is to add energy at higher temperature. Heat pumps are considered reverse cycle systems because for heating, the operation of the condenser is interchanged with that of the refrigeration evaporator.

Certain chlorofluoromethane and chlorofluoroethane derivatives have gained widespread use in refrigeration applications including air conditioning and heat pump applications owing to their unique combination of chemical and physical properties.

The majority of refrigerants utilized in vapor compression systems are either single components fluids or azeotropic mixtures. Single component fluids and azeotropic mixtures are characterized as constant-boiling because they exhibit isothermal and isobaric evaporation and condensation. The use of azeotropic mixtures as refrigerants is known in the art; for example, see R. C. Downing, FLUOROCARBON REFRIGERANTS HANDBOOK, Prentice-Hall, 1988 and U.S. Pat. Nos. 2,101,993 and 2,641,579.

R-502 is an azeotropic blend Which consists of monochlorodifluoromethane (R-22) and chloropentafluoroethane (R-115), a fully halogenated chlorofluorocarbon. R-502 has been routinely used for medium to low temperature refrigeration applications and has a boiling point of about $-50.1°$ F. $(-45.6°$ C.).

Azeotropic or azeotrope-like compositions are desired because they do not fractionate upon boiling. This behavior is desirable because in the previously described vapor compression equipment with which these refrigerants are employed, condensed material is generated in preparation for cooling or for heating purposes. Unless the refrigerant composition exhibits a constant boiling point, i.e. is azeotrope-like, fractionation and segregation will occur upon evaporation and condensation and undesirable refrigerant distribution may act to upset the cooling or heating.

Non-azeotropic mixtures have been disclosed as refrigerants for example in U.S. Pat. No. 4,303,536 but have not found widespread use in commercial applications even though the potential of non-azeotropic refrigerant blends to exhibit improved thermodynamic performance has often been discussed in the literature; see for example T. Atwood, "NARBS—The Promise and the Problem", American Society of Mechanical Engineers, Winter Annual Meeting, Paper 86-WA/HT-61, 1986 and M. O. McLinden et al., "*Methods for Comparing the Performance of Pure and Mixed Refrigerants in the Vapour Compression Cycle*". *Int. J. Refrig.* 10, 318(1987).

A blend of HFC-125 and HFC-143a was disclosed as having utility as a refrigerant in RESEARCH DISCLOSURE 15402, Feb. 1977 but this disclosure implied that such a blend was non-azeotropic. i.e. would fractionate upon evaporation or condensation, and stated that the blend was disadvantageous because it was flammable.

The use of non-azeotropic mixtures which fractionate during the refrigeration cycle introduces additional complexity into the system which necessitates hardware changes. The use of non-azeotropic refrigerants has been avoided primarily due to the added difficulty in charging and servicing refrigeration equipment and the situation is further complicated if an inadvertent leak in the system occurs during use or during service. The composition of the mixture could change affecting system pressures and system performance. If one component of the non-azeotropic mixture is flammable, then fractionation could shift the composition into the flammable region with potential adverse consequences.

U.S. Pat. No. 4,810,403 teaches that certain nonazeotropic blends of three or more halocarbon components maintain a substantially constant vapor pressure even after evaporative losses of up to 50 percent of the original refrigerant charge. In other words, the mixtures exhibit a certain degree of constant-boiling behavior even though they are non-azeotropic.

The art is continually seeking new fluorocarbon based azeotrope-like mixtures which offer alternatives for refrigeration and heat pump applications. Currently, of particular interest, are fluorocarbon based azeotrope-like mixtures which are considered to be environmentally safe substitutes for the presently used fully halogenated chlorofluorocarbons(CFC's). The latter are suspected of causing environmental problems in connection with the earth's protective ozone layer.

The substitute materials must also possess those properties unique to the CFC's including chemical stability, low toxicity, non-flammability, and efficiency in-use. The latter characteristic is important in refrigeration and air-conditioning especially where a loss in refrigerant thermodynamic performance or energy efficiency may have secondary environmental impacts through increased fossil fuel usage arising from an increased demand for electrical energy. Furthermore, the ideal CFC refrigerant substitute would not require major engineering changes to conventional vapor compression technology currently used with CFC refrigerants.

Mathematical models have substantiated that hydrofluorocarbons, such as pentafluoroethane(HFC-125) and 1,1,1-trifluoroethane(HFC-143a) will not adversely affect atmospheric chemistry, being negligible contributors to ozone depletion and to green-house global warming in comparison to the fully halogenated species. Although chlorodifluoromethane(HCFC-22) contains a chlorine atom in its molecular structure, it also contains a hydrogen atom and as such, its atmospheric lifetime is much lower than that of a fully halogenated CFC and it has a significantly lower ozone depletion potential.

Because HFC-143a is as efficient as R-502 and provides a modest increase in refrigeration capacity. HFC-143a might be considered a good refrigerant substitute for R-502. HFC-143a has a boiling point of about −53.7° F.(−47.6° C.). However, a disadvantage of HFC-143a as a refrigerant is that the vapor of HFC-143a is flammable. As a result, the shipping, handling, and use of HFC-143a have to be carefully controlled due to the potential flammability.

Because HFC-125 is nonflammable and provides a modest increase in refrigeration capacity compared with R-502, HFC-125 might be considered a good refrigerant substitute for R-502. HFC-125 has a boiling point of about −55.5° F.(−48.5° C.). However, a disadvantage of HFC-125 is that HFC-125 is about 5% less efficient than R-502.

HCFC-22 is used in most residential and light commercial air-conditioning, some industrial low-temperature requirements, and some medium- and low-temperature display cases in supermarkets. HCFC-22 has a boiling point of about −41.4° F.(−40.8° C.). Although HCFC-22 offers improved coefficient of performance(-COP) compared with R-502, the compressor discharge temperature of the refrigerant is much greater for HCFC-22 than for R-502. It is known in the art that excessive compressor discharge temperatures have a deleterious effect on compressor reliability. Some compressor manufacturers recommend that discharge temperatures be kept below 225°–250° F.(107°–121° C.).

As such, a refrigerant which has a low ozone depletion potential and is a negligible contributor to greenhouse global warming compared with fully halogenated CFC refrigerants, is nonflammable, has a COP and capacity comparable to that of R-502, and has a low compressor discharge temperature is needed in the art.

It is an object of this invention to provide novel azeotrope-like compositions based on pentafluoroethane; 1,1,1-trifluoroethane; and chlorodifluoromethane which will not fractionate under normal cooling or heating conditions.

Another object of the invention is to provide novel environmentally acceptable refrigerants for use in the aforementioned applications.

Other objects and advantages of the invention will become apparent from the following description.

DESCRIPTION OF THE INVENTION

In accordance with the invention, novel azeotrope-like compositions have been discovered comprising pentafluoroethane; 1,1,1-trifluoroethane; and chlorodifluoromethane. The azeotrope-like compositions comprise from about 13 to about 86 weight percent pentafluoroethane; from about 7 to about 57 weight percent 1,1,1-trifluoroethane; and from about 7 to about 80 weight percent chlorodifluoromethane which have a vapor pressure of about 167 psia(1113 kPa)±about 10 psia(67 kPa) at 70° F.(21.1° C.). These compositions are azeotrope-like because they are constant-boiling, i.e. exhibit essentially constant-vapor pressure versus composition and essentially identical liquid and vapor compositions over the aforementioned compositional ranges. These compositions were determined to be nonflammable in air at ambient conditions using the ASTM E-681 method as specified in the American Society of Heating, Refrigerating, and Air-Conditioning Engineers(ASHRAE) Standard 34.

In a most preferred embodiment of the invention, the azeotrope-like compositions of the invention comprise from about 13 to about 86 weight percent pentafluoroethane; from about 7 to about 55 weight percent 1,1,1-trifluoroethane; and from about 7 to about 80 weight percent chlorodifluoromethane. These compositions do not segregate or fractionate into the potentially flammable compositional region upon evaporation.

These most preferred azeotrope-like compositions of the invention have a vapor pressure of about 167 psia(1113 kPa)±about 5 psia(33 kPa).

Because the present compositions exhibit essentially constant-vapor pressure characteristics as the liquid mixture is evaporated and show relatively minor shifts in composition during evaporation, the compositions are advantageous in a vapor compression cycle as they mimic the performance of a constant-boiling single component or azeotropic mixture refrigerant.

Although it is not believed that a true azeotropic system is formed with pentafluoroethane; 1,1,1-trifluoroethane; and chlorodifluoromethane, the term "azeotrope-like" is used herein for the mixtures of the invention because in the claimed proportions, the compositions of pentafluoroethane; 1,1,1-trifluoroethane; and chlorodifluoromethane are constant-boiling or essentially constant-boiling.

All compositions within the indicated ranges, as well as certain compositions outside the indicated ranges, are azeotrope-like, as defined more particularly below.

From fundamental principles, the thermodynamic state of a fluid is defined by four variables: pressure, temperature, liquid composition and vapor composition, or P-T-X-Y, respectively. An azeotrope is a unique characteristic of a system of two or more components where X and Y are equal at the stated P and T. In practice, this means that the components of a mixture cannot be separated during a phase change, and therefore are useful in the cooling and heating applications as described above.

For the purpose of this discussion, azeotrope-like composition is intended to mean that the composition behaves like an azeotrope, i.e. has constant-boiling characteristics or a tendency not to fractionate upon boiling or evaporation. Thus, in such compositions, the composition of the vapor formed during boiling or evaporation is identical or substantially identical to the original liquid composition. Hence, during boiling or evaporation, the liquid composition, if it changes at all, changes only to a minimal or negligible extent. This is to be contrasted with non-azeotrope-like compositions in which during boiling or evaporation, the liquid composition changes to a substantial degree.

Thus, one way to determine whether a candidate mixture is "azeotrope-like" within the meaning of this invention, is to distill a sample thereof under conditions (i.e. resolution—number of plates) which would be expected to separate the mixture into its separate components. If the mixture is non-azeotropic or non-azeotrope-like, the mixture will fractionate. i.e. separate into its various components with the lowest boiling component distilling off first, and so on. If the mixture is azeotrope-like, some finite amount of a first distillation cut will be obtained which contains all of the mixture components and which is constant-boiling or behaves as a single substance. This phenomenon cannot occur if the mixture is not azeotrope-like i.e., it is not part of an azeotropic system.

It follows from the above that another characteristic of azeotrope-like compositions is that there is a range of compositions containing the same components in varying proportions which are azeotrope-like or constant-boiling. All such compositions are intended to be covered by the term azeotrope-like or constant-boiling as used herein. As an example, it is well known that at differing pressures, the composition of a given azeotrope will vary at least slightly as does the boiling point of the composition. Thus, an azeotrope of A and B represents a unique type of relationship but with a variable composition depending on temperature and/or pressure. As is readily understood by persons skilled in the art, the boiling point of the azeotrope will vary with the pressure.

The present compositions possess relative ozone depletion potentials in the range of about 0.004 to about 0.040 which is a significant improvement over the relative ozone depletion potentials of the known CFC refrigerants.

As such, the present invention meets the need in the art for a refrigerant which has a low ozone depletion potential and is a negligible contributor to green-house global warming compared with fully halogenated CFC refrigerants, is nonflammable, has a COP and capacity comparable to that of R-502, and has a low compressor discharge temperature.

In one process embodiment of the invention, the azeotrope-like compositions of the invention may be used in a method for producing refrigeration which comprises condensing a refrigerant comprising the azeotrope-like compositions and thereafter evaporating the refrigerant in the vicinity of a body to be cooled.

In another process embodiment of the invention, the azeotrope-like compositions of the invention may be used in a method for producing heating which comprises condensing a refrigerant comprising the azeotrope-like compositions in the vicinity of a body to be heated and thereafter evaporating the refrigerant.

The pentafluoroethane; 1,1,1-trifluoroethane; and chlorodifluoromethane of the novel azeotrope-like compositions of the invention are known materials. Preferably, the materials should be used in sufficiently high purity so as to avoid the introduction of adverse influences upon the cooling or heating properties or constant-boiling properties of the system.

It should be understood that the present compositions may include additional components so as to form new azeotrope-like compositions. Any such compositions are considered to be within the scope of the present invention as long as the compositions are constant-boiling or essentially constant-boiling and contain all of the essential components described herein.

The present invention is more fully illustrated by the following non-limiting Examples.

EXAMPLE 1

This example shows that various ternary blends of HFC-125, HFC-143a, and HCFC-22 undergo minimal fractionation and maintain an essentially constant vapor pressure during a vapor leak.

Two blends, designated Starting Liquid A(SLA) and Starting Liquid B(SLB) in Table I below, were prepared gravimetrically in an approximately 150 cubic centimeter vessel equipped with a magnetically driven stirrer and a 0-300 psia (0-2000 kPa) pressure transducer accurate to ±0.2%. This vessel was submerged in a constant temperature bath controlled at 70° F.(21.1° C.)±0.05° F.(0.03° C.). The vessel was charged with approximately 100 grams of the mixture. Vapor was allowed to escape from this vessel until about 80% of the original charge had dissipated. Vapor samples were collected for analysis at various stages during the experiment and were analyzed by standard gas chromatographic techniques; vapor pressure data were recorded at the same time that samples were taken. Vapor pressure and composition data are reported in Table I. In Table I, LRA is Liquid Residue A while LRB is Liquid Residue B.

TABLE I

FRACTIONATION DATA

| Sample | Percent Removal (%) | Vapor Pressure psia(kPa) | Composition in Weight Percent | | |
|---|---|---|---|---|---|
| | | | HFC-125 | HFC-143a | HCFC-22 |
| SLA | 0 | | 41.3 | 28.9 | 29.8 |
| 1 | 1.1 | 163.6(1091) | 44.2 | 28.0 | 27.8 |
| 2 | 13.2 | 163.2(1088) | 43.8 | 28.2 | 28.0 |
| 3 | 34.7 | 162.5(1083) | 43.0 | 28.6 | 28.4 |
| 4 | 55.4 | 161.5(107;) | 41.5 | 29.0 | 29.5 |
| 5 | 80.6 | 159.8(1065) | 38.6 | 29.7 | 31.7 |
| LRA | | | 35.9 | 30.2 | 33.9 |
| SLB | 0 | | 35.0 | 54.9 | 10.1 |
| 6 | 1.0 | 165.4(1103) | 35.7 | 54.8 | 9.5 |
| 7 | 12.0 | 165.0(1100) | 35.7 | 54.8 | 9.5 |
| 8 | 31.4 | 164.4(1096) | 35.6 | 54.8 | 9.6 |
| 9 | 50.7 | 163.9(1093) | 35.3 | 54.8 | 9.9 |
| 10 | 67.3 | 163.5(1090) | 34.9 | 54.9 | 10.2 |
| LRB | | | 34.7 | 54.2 | 11.1 |

These data demonstrate that with 80% of the original charge depleted, the vapor pressure had remained essentially constant, within ±3%, and very little shift in composition had occurred.

EXAMPLE 2

This example shows that certain HFC-125/HFC-143a/ HCFC-22 blends do not exhibit vapor flame limits in air, i.e. are nonflammable.

Flammability measurements were performed using the ASTM E-681 technique modified according to ASHRAE Standard 34. Briefly, this technique involved preparing fluorocarbon/air gas mixtures to a total pressure of one atmosphere(1O1 kPa) in a 5-liter spherical glass vessel, stirring the mixture with a magnetically driven propeller to ensure a uniform composition, and then attempting to ignite the mixture using an electrically activated kitchen match head as the ignition source. The range of compositions which exhibit no flammability was mapped by first determining the maximum, nonflammable composition of HFC-143a in HFC-125 and then the maximum, nonflammable composition of HFC-143a in HCFC-22. Next, the maximum, nonflammable composition of HFC-143a in a 50/50 by volume mixture of HFC-125 and HCFC-22 was determined. These compositions are reported in Table II.

TABLE II

| HFC-125/HCFC-22 Ratio (by volume) | Maximum, Nonflammable HFC-143a Composition (volume %) | Equivalent Weight % HFC-143a |
| --- | --- | --- |
| 0/100 | 58.3 | 57.5 |
| 100/0 | 69.6 | 61.6 |
| 50/50 | 63.5 | 58.6 |

It is possible to interpolate between these three points on a standard ternary diagram to determine the maximum, nonflammable compositions of HFC-143a in the three component HFC-125, HFC-143a, and HCFC-22 blends. Such a plot showed that three component vapor blends are nonflammable according to the ASTM E-681 method as long as they contained no more than about 57 weight percent HFC-143a.

The ternary diagram was used to plot segregation curves which depicted the changing vapor phase composition of a mixture as it evaporated. These curves were either estimated using ideal vapor-liquid equilibrium calculations or the actual experimental data obtained in Example 1 above were used. Example 1 showed that the effects of segregation in this particular blend are relatively minor. Such segregation experiments and calculations indicated that three component HFC-125, HFC-143a, and HCFC-22 liquid mixtures, containing no more than about 55 weight percent HFC-143a, did not fractionate to the extent that the flammable composition range was reached.

EXAMPLE 3

This example shows that constant-boiling HFC-125/HFC-143a/HCFC-22 blends have certain advantages when compared to other refrigerants which are currently used in certain refrigeration cycles.

The theoretical performance of a refrigerant at specific operating conditions can be estimated from the thermodynamic properties of the refrigerant using standard refrigeration cycle analysis techniques; see for example, R. C. Downing, FLUOROCARBON REFRIGERANTS HANDBOOK, Chapter 3, Prentice-Hall, 1988. The coefficient of performance (COP) is a universally accepted measure, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the volumetric efficiency of the refrigerant. To a compressor engineer, this value expresses the capability of a compressor to pump quantities of heat for a given volumetric flow rate of refrigerant. In other words, given a specific compressor, a refrigerant with a higher capacity will deliver more cooling or heating power.

We have performed this type of calculation for a medium to low temperature refrigeration cycle where the condenser temperature is typically 100° F.(37.8° C.) and the evaporator temperature is typically −40 to −10° F.(−40° to −23.3° C.). We have further assumed isentropic compression and a compressor inlet temperature of 65° F.(18.3° C.). Such calculations were performed for various combinations of HFC-125, HFC-143a, and HCFC-22 as well as for R-502. Table III lists the COP and capacity of the various blends relative to that of R-502 over a range of condenser and evaporator temperatures. In Table III, * means that the COP and capacity are given relative to R-502. In Table III, the condenser temperature for parts A and B was 100° F.(37.8° C.); the evaporator temperature for part A was −10° F.(−23.3° C.) while the evaporator temperature for part B was −40° F.(−40° C.).

TABLE III

THERMODYNAMIC PERFORMANCE

| Composition HFC-125/HFC-143a/HCFC-22 (by weight) | COP* | Capacity* | Discharge Temperature °F.(°C.) |
| --- | --- | --- | --- |
| PART A: | | | |
| 0/0/100 | 1.027 | 0.95 | 239(115) |
| 0/100/0 | 0.997 | 1.08 | 188(86.7) |
| 100/0/0 | 0.956 | 1.09 | 170(76.7) |
| 41/29/30 | 1.007 | 1.05 | 191(88.3) |
| 14/52/34 | 1.010 | 1.04 | 198(92.2) |
| 85/7/8 | 0.970 | 1.08 | 175(79.4) |
| 13/9/78 | 1.024 | 0.97 | 221(105) |
| 35/58/7 | 0.993 | 1.08 | 184(84.4) |
| R-502 | | | 192(88.9) |
| PART B: | | | |
| 0/0/100 | 1.015 | 0.92 | 303(150.6) |
| 0/100/0 | 1.010 | 1.09 | 228(108.9) |
| 100/0/0 | 0.965 | 1.09 | 203(95) |
| 41/29/30 | 1.005 | 1.03 | 235(112.8) |
| 14/52/34 | 1.010 | 1.03 | 244(117.8) |
| 85/7/8 | 0.975 | 1.07 | 211(99.4) |
| 13/9/78 | 1.015 | 0.94 | 278(136.7) |
| 35/58/7 | 0.995 | 1.07 | 223(106.1) |
| R-502 | | | 235(112.8) |

Table IV summarizes similar data but for a condenser temperature of 140° F.(60° C.) wherein due to the higher condensing temperature, the system is under much greater stress. The evaporator temperature was −10° F. (−23.3° C.). In Table IV, * means that the COP and capacity are given relative to R-502.

TABLE IV

THERMODYNAMIC PERFORMANCE

| Composition HFC-125/HFC-143a/HCFC-22 (by weight) | COP* | Capacity* | Discharge Temperature °F.(°C.) |
| --- | --- | --- | --- |
| 0/0/100 | 1.110 | 1.05 | 293(145) |
| 0/100/0 | 0.924 | 0.99 | 229(109) |
| 100/0/0 | 0.721 | 0.81 | 207(97) |
| 41/29/30 | 0.994 | 1.03 | 233(112) |
| 14/52/34 | 1.020 | 1.05 | 241(116) |
| 85/7/8 | 0.843 | 0.93 | 212(100) |
| 13/9/78 | 1.090 | 1.05 | 270(132) |
| 35/58/7 | 0.930 | 1.01 | 223(106) |
| R-502 | | | 233(112) |

Tables III and IV include data for the three component refrigerants, HFC-125/HFC-143a/HCFC-22, under the same cycle conditions. As discussed earlier, each individual component suffers from some problem when compared with R-502. Table III shows examples of blends within the scope of this invention which have similar COP and capacity to R-502. The calculated discharge temperatures of the blends are in the acceptable range. In addition to being minimally segregating, the three component blends overcome the potential drawbacks of the single component refrigerants. In other words, in contrast to HFC-143a, the present blends are nonflammable; compared with HFC-125, the present blends have COPs as shown in Tables III and IV comparable to those of R-502 and compared with HCFC-22, the present blends have lower discharge temperatures as shown in Tables III and IV.

At the higher condensing temperature, the excessive discharge temperature of HCFC-22 and the decrease in performance of HFC-125 and HFC-143a becomes even more apparent. However, the data shown in Table IV demonstrate that it is possible to formulate three component compositions, within the scope of this invention, which offer performance and discharge temperatures comparable to R-502.

Having described the invention in detail and by reference to preferred embodiments thereof, it will be apparent that modifications and variations are possible without departing from the scope of the invention defined in the appended claims.

What is claimed is:

1. Azeotrope-like compositions consisting essentially of from about 13 to about 86 weight percent pentafluoroethane; from about 7 to about 57 weight percent 1,1,1-trifluoroethane; and from about 7 to about 80 weight percent chlorodifluoromethane which have a vapor pressure of about 167 psia±about 10 psia at 70° F.

2. The azeotrope-like compositions of claim 1 consisting essentially of from about 13 to about 86 weight percent said pentafluoroethane; from about 7 to about 55 weight percent said 1,1,1-trifluoroethane; and from about 7 to about 80 weight percent said chlorodifluoromethane.

3. The azeotrope-like compositions of claim 1 wherein said compositions have said vapor pressure of about 167 psia±about 5 psia.

4. A method for producing refrigeration which comprises condensing a refrigerant consisting essentially of the azeotrope-like compositions of claim 1 and thereafter evaporating said refrigerant in the vicinity of a body to be cooled.

5. A method for producing refrigeration which comprises condensing a refrigerant consisting essentially of the azeotrope-like compositions of claim 2 and thereafter evaporating said refrigerant in the vicinity of a body to be cooled.

6. A method for producing refrigeration which comprises condensing a refrigerant consisting essentially of the azeotrope-like compositions of claim 3 and thereafter evaporating said refrigerant in the vicinity of a body to be cooled.

7. A method for producing heating which comprises condensing a refrigerant consisting essentially of the azeotrope-like compositions of claim 1 in the vicinity of a body to be heated and thereafter evaporating said refrigerant.

8. A method for producing heating which comprises condensing a refrigerant consisting essentially of the azeotrope-like compositions of claim 2 in the vicinity of a body to be heated and thereafter evaporating said refrigerant.

9. A method for producing heating which comprises condensing a refrigerant consisting essentially of the azeotrope-like compositions of claim 3 in the vicinity of a body to be heated and thereafter evaporating said refrigerant.

* * * * *